United States Patent
West

(10) Patent No.: US 7,113,886 B2
(45) Date of Patent: Sep. 26, 2006

(54) CIRCUIT AND METHOD FOR DISTRIBUTING EVENTS IN AN EVENT STREAM

(75) Inventor: Burnell G. West, Fremont, CA (US)

(73) Assignee: Credence Systems Corporation, Milpitas, CA (US)

( * ) Notice: Subject to any disclaimer, the term of this patent is extended or adjusted under 35 U.S.C. 154(b) by 0 days.

(21) Appl. No.: 10/056,287

(22) Filed: Jan. 23, 2002

(65) Prior Publication Data

US 2003/0139899 A1    Jul. 24, 2003

(51) Int. Cl.
G04F 3/00 (2006.01)
G01D 1/00 (2006.01)
H03M 1/50 (2006.01)
H03K 2/00 (2006.01)

(52) U.S. Cl. .................. 702/178; 324/76.48; 341/166; 368/118; 377/20; 377/49

(58) Field of Classification Search .................. 702/79, 702/176, 177, 178; 368/96, 118, 250; 377/49, 377/20; 370/238, 252; 714/45; 703/17; 331/16; 375/345; 341/166; 324/76.48
See application file for complete search history.

(56) References Cited

U.S. PATENT DOCUMENTS

| | | | |
|---|---|---|---|
| 4,731,768 A | 3/1988 | Easterday | 368/118 |
| 4,894,823 A * | 1/1990 | Adelmann et al. | 370/252 |
| 4,996,474 A * | 2/1991 | Tambe et al. | 324/76.48 |
| 5,485,457 A * | 1/1996 | Aramaki | 370/238 |
| 5,642,478 A * | 6/1997 | Chen et al. | 714/45 |
| 5,742,188 A | 4/1998 | Jiang et al. | 327/99 |
| 5,764,524 A * | 6/1998 | Andersson et al. | 702/79 |
| 5,815,634 A * | 9/1998 | Daum et al. | 386/96 |
| 5,886,660 A * | 3/1999 | Loewenstein | 341/166 |
| 5,940,467 A * | 8/1999 | Fransson | 377/49 |
| 6,434,211 B1 * | 8/2002 | Lloyd et al. | 377/20 |
| 2002/0133325 A1 * | 9/2002 | Hoare et al. | 703/17 |
| 2003/0035502 A1 * | 2/2003 | Boerker | |

FOREIGN PATENT DOCUMENTS

| | | |
|---|---|---|
| EP | 0 396 272 A2 | 11/1990 |
| EP | 0 901 094 A2 | 1/1999 |
| EP | 0891094 | 1/1999 |

OTHER PUBLICATIONS

U.S. Appl. No. 09/643,576, filed Aug. 22, 2000, West.
B. Hodlsworth: "chapters 2.10.2.11, 5.6-5.9.6, 8-1-8.10" Digital Logic Design Third Edition XP-226117.

* cited by examiner

Primary Examiner—Michael Nghiem
Assistant Examiner—John Le

(57) ABSTRACT

A circuit and related method for distributing events in an event stream (i.e., an electronic signal having a plurality of rising edge transitions and falling edge transitions). The circuit distributes the events in a primary event stream across multiple secondary event streams in such a way that the event rate in each of the secondary event streams is lower than the event rate in the primary event stream, but the relative timing of the events in the primary event stream is maintained in each of the secondary event streams. The secondary event streams can then be provided to respective timestamp circuits, which record the times at which events occur in the secondary event streams. Since the relative timing of the events in the primary event stream is maintained in each of the secondary event streams, the multiple timestamp circuits collectively record the times at which events occur in the primary event stream. The circuit and related method can be used when debugging/testing semiconductor devices.

27 Claims, 8 Drawing Sheets

CIRCUIT AND METHOD FOR DISTRIBUTING EVENTS IN AN EVENT STREAM

BACKGROUND OF THE INVENTION

1. Field of the Invention

The present invention relates to electronic circuits and to electronic signals. More particularly, the present invention relates to measuring the times at which events occur in electronic signals.

2. Related Art

It is often desirable to detect and record the times at which events occur in an event stream. An event stream is an electronic signal having multiple events. The electronic signal having multiple events can be a single-ended signal or a differential signal. A single-ended signal consists of a single signal. In this case, the term event refers to a transition from a low level to a high level (i.e., a rising edge transition) or a transition from a high level to a low level (i.e., a falling edge transition). On the other hand, a differential signal consists of a pair of signals. The first signal is at a logic high level whenever the second signal is at a logic low level, and the first signal is at a logic low level whenever the second signal is at a logic low level. In this case, the term event refers to a transition from a high level to a low level on one signal and a simultaneous transition from a low level to a high level on the other signal. The time of this event is the moment when the voltages on the two signals are equal.

One situation where it is desirable to detect and record the times at which events occur in an event stream is while testing/debugging a semiconductor device. In this situation, a semiconductor device is electrically coupled to a tester. The tester is a machine that generates one or more test signals and provides the one or more test signals to one or more input terminals on the semiconductor device. The one or more test signals cause operations to occur in the semiconductor device and cause the semiconductor device to output one or more output signals or event streams. The event streams can then be analyzed by the tester to determine whether or not the semiconductor device is operation properly.

To detect and record the times at which events occur in an event stream, the event stream can be provided to a timestamp circuit, which generates a timestamp. A timestamp is a digital representation of the time at which an event occurs in an event stream. When the first event in the event stream occurs, the timestamp circuit generates a first timestamp for the first event thereby recording the time at which the first event occurs. When the second event in the event stream occurs, the timestamp circuit generates a second timestamp for the second event thereby recording the time at which the second event occurs. When the third event in the event stream occurs, the timestamp circuit generates a third timestamp for the third event thereby recording the time at which the first event occurs, and so on.

As used herein, a timestamp circuit is a circuit that is responsive to a reference clock and that creates a digital representation of the time at which an event occurs. The digital representation of the time at which an event occurs has two components. The first component is the specific clock cycle of the reference clock within which the event occurs. The second component is the time at which the event occurs within the specific clock cycle of the reference clock. Since each event is represented by the two components which are generated with respect to a reference clock, subsequent processing steps can easily determine timing relationships between each event which is useful when debugging/testing an integrated circuit device.

Timestamp circuits can generate timestamps for all of the events in an event stream well as long as the event rate in the event stream is relatively low (e.g., less than two events every 2.5 ns). However, when the event rate in the event stream is relatively high, as is the case with many event streams, timestamp circuits cannot record all of the events in the event stream. This is because a minimum period of time must elapse between consecutive events (e.g., 2.5 ns) for a timestamp circuit to correctly record consecutive events. One solution to this problem is to design a timestamp circuit that can record all of the events in the high event rate event streams. Unfortunately, such timestamp circuits cannot be designed using conventional semiconductor fabrication technologies or are too expensive to implement using conventional technologies.

SUMMARY OF THE INVENTION

The present invention provides a technique for distributing events in a primary event stream. The primary event stream is typically output by a semiconductor device that is being tested/debugged. According to the technique, the events in the primary event stream are distributed across multiple secondary event streams in such a way that the event rate in each of the secondary event streams is lower than the event rate in the primary event stream, but the relative timing of the events in the primary event stream is maintained in each of the secondary event streams. The secondary event streams can then be provided to respective timestamp circuits, which record the times at which events occur in the secondary event streams. Since the relative timing of the events in the primary event stream is maintained in each of the secondary event streams, the multiple timestamp circuits collectively record the times at which events occur in the primary event stream.

Various embodiments, aspects, and advantages of the present invention will become apparent from the following descriptions and the accompanying drawings.

BRIEF DESCRIPTION OF THE DRAWINGS

For a more complete understanding of the present invention and for further embodiments, aspects, and advantages, reference is now made to the following description taken in conjunction with the accompanying drawings, in which.

DETAILED DESCRIPTION OF THE INVENTION

Figure 1:
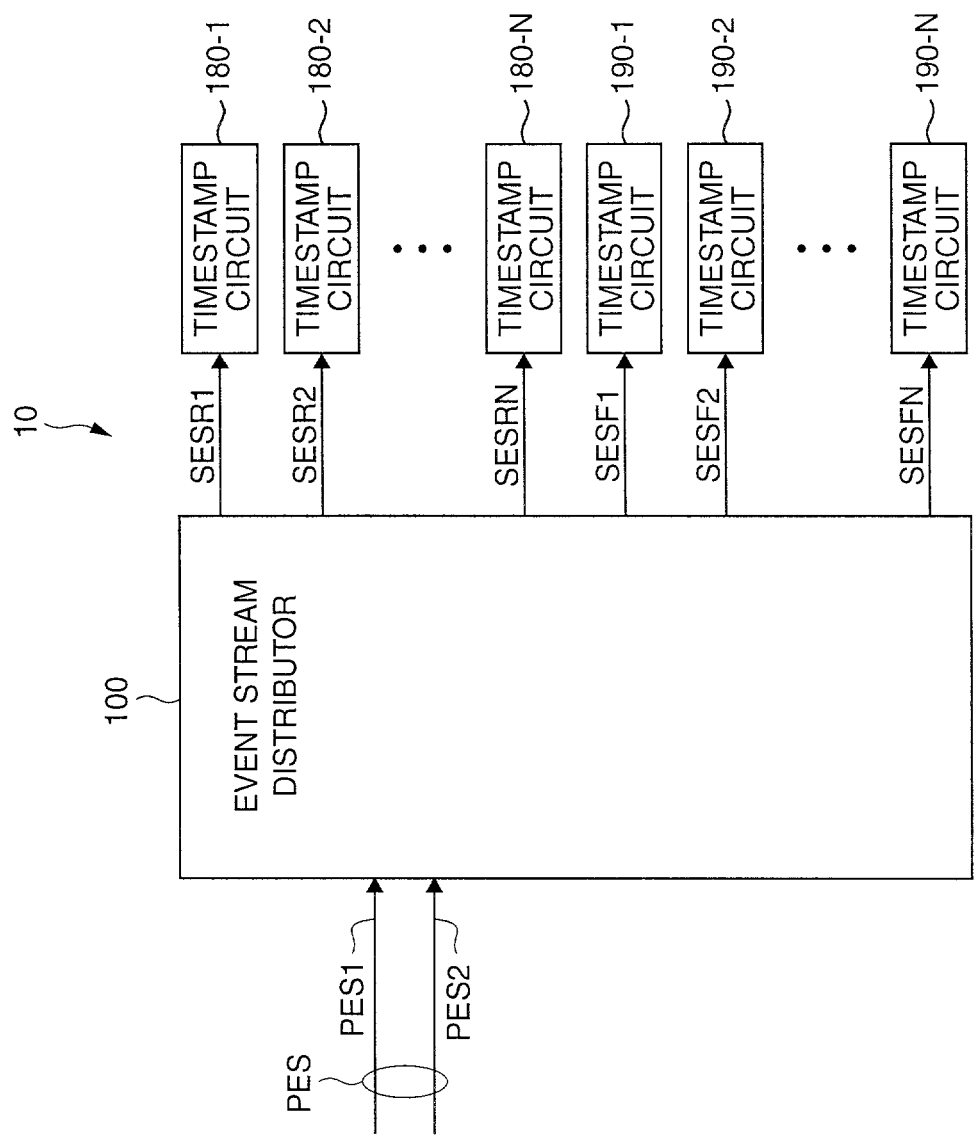
FIG. 1 is a block diagram of a timestamp circuit, according to some embodiments of the present invention.

Various embodiments of the present invention and their advantages are best understood by referring to FIGS. 1 through 8 of the drawings. Like reference numerals are used for like and corresponding parts of the various drawings.

I. Timestamp Circuit Including an Event Stream Distributor and Timestamp Circuits FIG. 1 is a block diagram of a timestamp system 10, according to some embodiments of the present invention. Timestamp system 10 includes an event stream distributor 100, timestamp circuits 180 (separately labeled 180-1, 180-2, ..., 180-N, where N=1, 2, 3, ...), and timestamp circuits 190 (separately labeled 190-1, 190-2, ..., 190-N, where N=1, 2, 3, ...).

Timestamp system 10 receives a primary event stream PES that includes events. In the embodiment shown, primary event stream PES is a differential signal that consists of two signals: non-inverted primary event stream PES1 and inverted primary event stream PES2. In other embodiments, primary event stream PES can be a single-ended signal.

Event stream distributor 100 distributes the events in non-inverted primary event stream PES1 among multiple rising edge secondary event streams SESR (separately labeled SESR1, SESR2, ..., SESRN, where N=1, 2, 3, ...). More specifically, event stream distributor 100 distributes the rising edge events in non-inverted primary event stream PES1 such that the first rising edge event is provided to timestamp circuit 180-1, the second rising edge event is provided to timestamp circuit 180-2, ..., the $N^{th}$ rising edge event is provided to timestamp circuit 180-N, the $N+1^{th}$ rising edge event is provided to timestamp circuit 180-1, the $N+2^{th}$ rising edge event is provided to timestamp circuit 180-2, ..., the $2N^{th}$ rising edge event is provided to timestamp circuit 180-N, and so on. Similarly, event stream distributor 100 distributes the events in inverted primary event stream PES2 among multiple falling edge secondary event streams SESF (separately labeled SESF1, SESF2, ..., SESFN, where N=1, 2, 3, ...). More specifically, event stream distributor 100 distributes falling edge events in inverted primary event stream PES2 such that the first falling edge event is provided to timestamp circuit 190-1, the second falling edge event is provided to timestamp circuit 190-2, ..., the $N^{th}$ falling edge event is provided to timestamp circuit 190-N, the $N+1^{th}$ falling edge event is provided to timestamp circuit 190-1, the $N+2^{th}$ falling edge event is provided to timestamp circuit 190-2, ..., the $2N^{th}$ falling edge event is provided to timestamp circuit 190-N, and so on.

Timestamp circuits 180 and 190 generate a timestamp for each event that occurs in their respective secondary event streams. An exemplary timestamp circuit, which can be used for timestamp circuits 180 and 190, is disclosed in co-pending and commonly assigned U.S. patent application, Ser. No. 09/643,576, entitled "Time-To-Digital Converter," which is herein incorporated by reference in its entirety. This Application teaches a technique for generating a digital representation of the time at which an event occurs using two components. The first component is the leading edge of the specific reference clock cycle within which the event appears, and the second component is an integer M<N, where NdT is equal to the period of the reference clock and M is a number of time intervals dT after the leading edge of the reference clock such that the event occurs between MdT and (M+1)dT. Thus, multiple timestamp circuits of this type can each receive a secondary event stream from the event stream distributor 100 of the present invention and record the times at which events occur in each of these secondary event streams. Since the relative timing of the events in the primary event stream is maintained in each of the secondary event streams via the timestamp circuits, the timing of the events in the primary event stream can be reconstructed and thus used when debugging/testing an integrated circuit device.

It should be recognized that the primary event stream PES can be distributed across any number of secondary event streams SES. As those of ordinary skill in the art will recognize, the number of secondary event streams SES required in a particular application is a function of (1) the maximum expected event rate in the primary event stream PES; and (2) the minimum period of time that must elapse between consecutive events for a particular type of timestamp circuit to accurately record all of the events in the primary event stream PES.

II. Event Stream Distributor Using Johnson Counters

A. Structure

Figure 2:
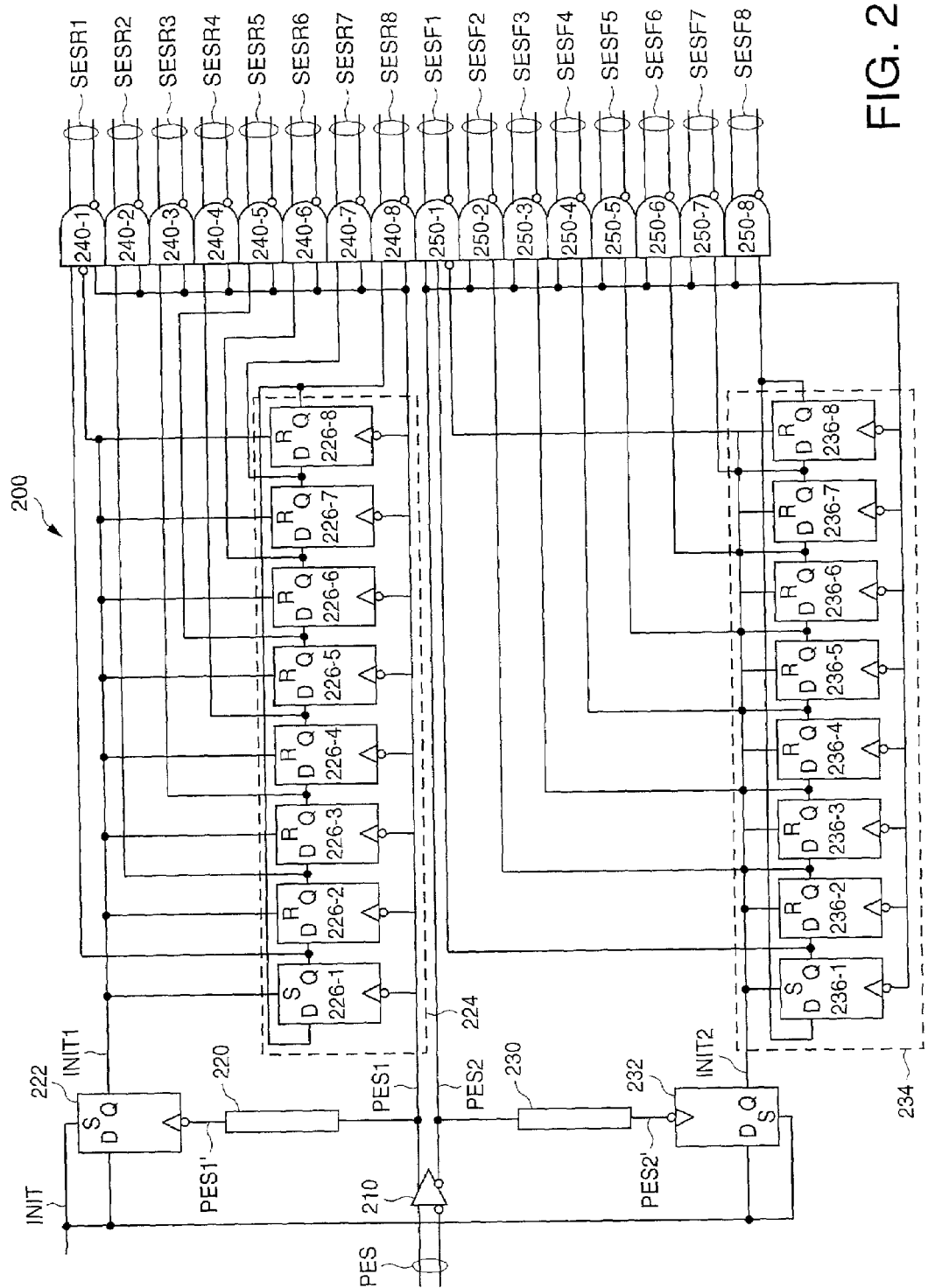
FIG. 2 is a schematic diagram of an event stream distributor that uses Johnson counters, according to some embodiments of the present invention.
Figure 3:
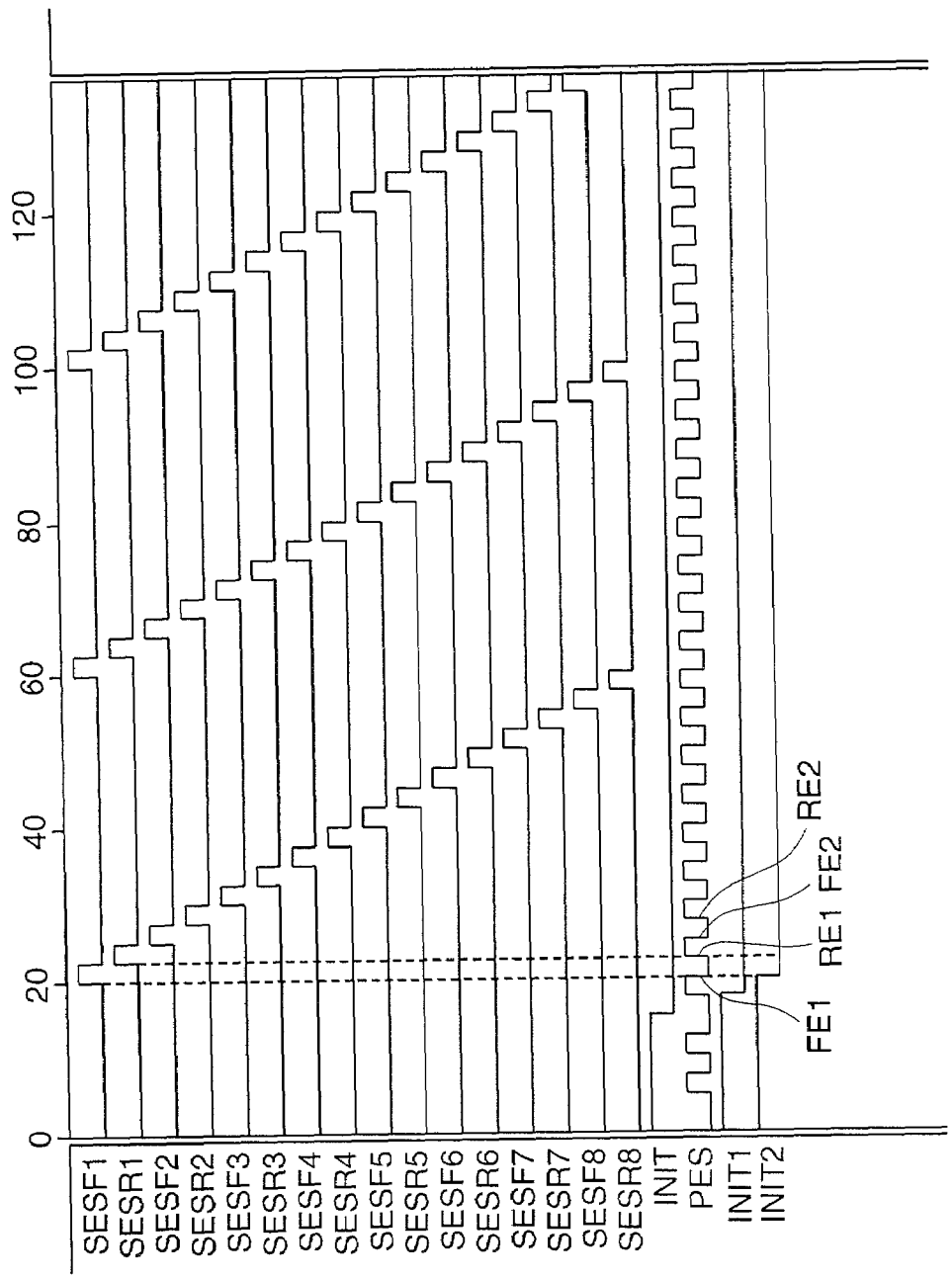
FIG. 3 is a timing diagram that includes waveforms for a primary event stream and corresponding secondary event streams.

FIG. 2 is a schematic diagram of an event stream distributor 200, according to some embodiments of the present invention. Event stream distributor 200 includes an input portion, a rising edge distributor, and a falling edge distributor. The input portion includes a buffer 210. The rising edge distributor includes a delay element 220, a D flip-flop 222, a Johnson counter 224, and AND gates 240 (separately labeled 240-1 through 240-8). Johnson counter 224 includes D flip-flops 226 (separately labeled 226-1 through 226-8). The falling edge distributor includes a delay element 230, a D flip-flop 232, a Johnson counter 234, and AND gates 250 (separately labeled 250-1 through 250-8). Johnson counter 234 includes D flip-flops 236 (separately labeled 236-1 through 236-8).

Buffer 210 is coupled to receive a primary event stream PES. In the embodiment shown, primary event stream PES is a differential signal. In other embodiments, primary event stream PES is a single-ended signal. Buffer 210 receives primary event stream PES, buffers primary event stream PES, and outputs a non-inverted primary event stream PES1 at its non-inverting output and outputs an inverted primary event stream PES2 at its inverting output.

Delay element 220 is coupled to receive non-inverted primary event stream PES1 at its input. Delay element 220 delays non-inverted primary event stream PES1 and outputs delayed primary event stream PES1'.

D flip-flop 222 is coupled to receive delayed primary event stream PES1' at its inverting clock input. D flip-flop 222 is also coupled to receive an initialization signal INIT at its set S input and at its D input. D flip-flop 222 outputs an initialization signal INIT1 at its Q output. Initialization signal INIT1 is used to set D flip-flop 226-1 and reset D flip-flops 226-2 through 226-8.

Each D flip-flop 226 of Johnson counter 224 is coupled to receive non-inverted primary event stream PES1 at its inverting clock input. As such, D flip-flops 226 are simultaneously clocked by the falling edges in primary event stream PES1. D flip-flops 226 of Johnson counter 224 are coupled to one another in a ring-like configuration. Specifically, the Q output of D flip-flop 226-1 is coupled to the D input of D flip-flop 226-2, the Q output of D flip-flop 226-2 is coupled to the D input of D flip-flop 226-3, the Q output of D flip-flop 226-3 is coupled to the D input of D flip-flop 226-4, and so on until the Q output of D flip-flop 226-8 is coupled to the D input of D flip-flop 226-1. The set S input of D flip-flop 226-1 is coupled to receive initialization signal INIT1, and the reset R inputs of D flip-flops 226-2 through 226-8 are coupled to receive initialization signal INIT1. When initialization signal INIT1 is asserted, D flip-flop 226-1 is set and D flip-flops 226-2 through 226-8 are reset.

Each AND gate 240 is coupled to receive non-inverted primary event stream PES1 at a first non-inverting input. Each AND gate 240 is also coupled to a respective Q output of a respective D flip-flop 226 at a second non-inverting input. AND gate 240-1 includes an inverting input that is coupled to receive initialization signal INIT1. Each AND gate 240 outputs a respective rising edge secondary event stream SESR (separately labeled SESR1 through SESR8). In the embodiment shown, secondary event streams SESR are differential signals. In other embodiments, secondary event streams SESR can be single-ended signals.

Delay element 230 is coupled to receive inverted primary event stream PES2 at its input terminal. Delay element 230 delays inverted primary event stream PES2 and outputs delayed primary event stream PES2'.

D flip-flop 232 is coupled to receive delayed primary event stream PES2' at its inverting clock input. D flip-flop 232 is also coupled to receive an initialization signal INIT at its set S input and at its D input. D flip-flop 232 outputs an initialization signal INIT2 at its Q output. Initialization signal INIT2 is used to set D flip-flop 236-1 and reset D flip-flops 236-2 through 236-8.

Each D flip-flop 236 of Johnson counter 234 is coupled to receive inverted primary event stream PES2 at its inverting clock input. As such, D flip-flops 236 are simultaneously clocked by the falling edges of inverted primary event stream PES2. D flip-flops 236 of Johnson counter 234 are coupled to one another in a ring-like configuration. Specifically, the Q output of D flip-flop 236-1 is coupled to the D input of D flip-flop 236-2, the Q output of D flip-flop 236-2 is coupled to the D input of D flip-flop 236-3, the Q output of D flip-flop 236-3 is coupled to the D input of D flip-flop 236-4, and so on until the Q output of D flip-flop 236-8 is coupled to the D input of D flip-flop 236-1. The set S input of D flip-flop 236-1 is coupled to receive initialization signal INIT2, and the reset R inputs of D flip-flops 236-2 through 236-8 are coupled to receive initialization signal INIT2. When initialization signal INIT2 is asserted, D flip-flop 236-1 is set and D flip-flops 236-2 through 236-8 are reset.

Each AND gate 250 is coupled to receive inverted primary event stream PES2 at a first non-inverting input. Each AND gate 250 is also coupled to a respective Q output of a respective D flip-flop 236 at a second non-inverting input. AND gate 250-1 includes an inverting input that is coupled to receive initialization signal INIT2. Each AND gate 250 outputs a respective falling edge secondary event stream SESF (separately labeled SESF1 through SESF8). In the embodiment shown, secondary event streams SESF are differential signals. In other embodiments, secondary event streams SESF can be single-ended signals.

B. Operation

Event stream distributor 200 operates in an initialization mode and a normal mode. When operating in initialization mode, Johnson counters 224 and 234 are initialized. When operating in normal mode, the rising edge distributor of event stream distributor 200 distributes rising edge events in primary event stream PES among rising edge secondary event streams SESR1 through SESR8, and the falling edge distributor of event stream distributor 200 distributes falling edge events in primary event stream PES among secondary event streams SESF1 through SESF8. Reference is made to the timing diagram of FIG. 3 when describing the operation of event stream distributor 200.

Event stream distributor 200 is placed in initialization mode by raising and holding initialization signal INIT at a logic high level. A falling edge in primary event stream PES travels through buffer 210 and appears at the non-inverting output of buffer 210 as a falling edge in inverted primary event stream PES1. This falling edge travels through delay element 220 and clocks D flip-flop 222 thereby raising initialization signal INIT1 to a logic high level. This sets D flip-flop 226-1 and resets D flip-flops 222-2 through 226-8. Thus, a logic high signal appears at the Q output of D flip-flop 226-1, which enables AND gate 240-1, while logic low signals appear at the Q outputs of D flip-flops 226-2 through 226-8, which disable AND gates 240-2 through 240-8.

Similarly, a rising edge in primary event stream PES travels through buffer 210 and appears at the inverting output of buffer 210 as a falling edge in inverted primary event stream PES2. This falling edge travels through delay element 230 and clocks D flip-flop 232 thereby raising initialization signal INIT2 to a logic high level. This sets D flip-flop 236-1 and resets D flip-flops 232-2 through 236-8. Thus, a logic high signal appears at the Q output of D flip-flop 236-1, which enables AND gate 250-1, while logic low signals appear at the Q outputs of D flip-flops 236-2 through 236-8, which disable AND gates 250-2 through 250-8.

Note that secondary event streams SESR1 through SESR8 and SESF1 through SESF8 are held at logic low levels when event stream distributor 200 is in initialization mode. Event stream distributor 200 is then taken out of initialization mode and placed in normal mode by lowering and holding initialization signal INIT at a logic low level.

When operating in normal mode, the falling edge distributor of event stream distributor 200 operates as follows. The first falling edge in primary event stream PES (labeled FE1 in FIG. 3) propagates through buffer 210 and appears at the inverting output of buffer 210 as a rising edge in inverted primary event stream PES2. The rising edge in inverted primary event stream PES2 propagates through AND gate 250-1 where it appears as the first rising edge in secondary event stream SESF1. Note that the rising edge in inverted primary event stream PES2 appears at the output of AND gate 250-1 since the Q output of D flip-flop 236-1 is at a logic high level, but does not appear at the outputs of AND gates 250-2 through 250-8 since the Q outputs of D flip-flops 236-2 through 236-8 are at logic low levels.

The first rising edge in primary event stream PES (labeled RE1 in FIG. 3) propagates through buffer 210 and appears at the inverting output of buffer 210 as a falling edge in inverted primary event stream PES2. This falling edge clocks D-flip flops 236-1 through 236-8 causing the logic high value stored in D flip-flop 236-1 to shift into D flip-flop 236-2. As a result, the Q output of D flip-flop 236-2 is held at a logic high level and the Q outputs of D flip-flops 236-1 and 236-3 through 236-8 are held at logic low levels, enabling AND gate 250-2 and disabling AND gates 250-1 and 250-3 through 250-8.

The second falling edge in primary event stream PES (labeled FE2 in FIG. 3) propagates through buffer 210 and appears at the inverting output of buffer 210 as a rising edge in inverted primary event stream PES2. The rising edge in inverted primary event stream PES2 propagates through AND gate 250-2 where it appears as the first rising edge in secondary event stream SESF2. Note that the rising edge in inverted primary event stream PES2 appears at the output of AND gate 250-2 since the Q output of D flip-flop 236-2 is at a logic high level, but does not appear at the outputs of AND gates 250-1 and 250-3 through 250-8 since the Q outputs of D flip-flops 236-2 through 236-8 are at logic low levels.

The second rising edge in primary event stream PES (labeled RE2 in FIG. 3) propagates through buffer 210 and appears at the inverting output of buffer 210 as a falling edge in inverted primary event stream PES2. This falling edge clocks D-flip flops 236-1 through 236-8 causing the logic high value stored in D flip-flop 236-2 to shift into D flip-flop 236-3. As a result, the Q output of D flip-flop 236-3 is held at a logic high level and the Q outputs of D flip-flops 236-1 through 236-2 and 236-4 through 236-8 are held at logic low levels, enabling AND gate 250-3 and disabling AND gates 250-1 through 250-2 and 250-4 through 250-8.

The process described above continues so that the third falling edge in primary event stream PES appears as the first rising edge in secondary event stream SESF3, the fourth falling edge in primary event stream PES appears as the first rising edge in secondary event stream SESF4, the fifth falling edge in primary event stream PES appears as the first rising edge in secondary event stream SESF5, the sixth falling edge in primary event stream PES appears as the first rising edge in secondary event stream SESF6, the seventh falling edge in primary event stream PES appears as the first rising edge in secondary event stream SESF7, the eighth falling edge in primary event stream PES appears as the first rising edge in secondary event stream SESF8, the ninth falling edge in primary event stream PES appears as the second rising edge in secondary event stream SESF1, the tenth falling edge in primary event stream PES appears as the second rising edge in secondary event stream SESF2, the eleventh falling edge in primary event stream PES appears as the second rising edge in secondary event stream SESF3, and so on. Thus AND gates 250 function as a plurality of secondary event stream paths that are selectively enabled by output signals generated by Johnson counter 234.

For each falling edge in primary event stream PES, the rising propagation delay through buffer 210, the conductor/interconnect line between buffer 210 and its respective AND gate 250, and through its respective AND gate 250 may be slightly different. This is because the length of the conductor/interconnect lines may be different and since the delay through the buffer and each AND gate may be different. Using known calibration techniques, the differences between the propagation delays in each signal path can be measured. As a result, the relative timing between the falling edges in primary event stream PES can be maintained.

When operating in normal mode, the rising edge distributor of event stream distributor 200 operates as follows. The first rising edge in primary event stream PES (labeled RE1 in FIG. 3) propagates through buffer 210 and appears at the non-inverting output of buffer 210 as a rising edge in non-inverted primary event stream PES1. The rising edge in non-inverted primary event stream PES1 propagates through AND gate 240-1 where it appears as the first rising edge in secondary event stream SESR1. Note that the rising edge in non-inverted primary event stream PES1 appears at the output of AND gate 240-1 since the Q output of D flip-flop 226-1 is at a logic high level, but does not appear at the outputs of AND gates 240-2 through 240-8 since the Q outputs of D flip-flops 226-2 through 226-8 are at logic low levels.

The first falling edge in primary event stream PES (labeled FE1 in FIG. 3) propagates through buffer 210 and appears at the non-inverting output of buffer 210 as a falling edge in non-inverted primary event stream PES1. This falling edge clocks D-flip flops 226-1 through 226-8 causing the logic high value stored in D flip-flop 226-1 to shift into D flip-flop 226-2. As a result, the Q output of D flip-flop 226-2 is held at a logic high level and the Q outputs of D flip-flops 226-1 and 226-3 through 226-8 are held at logic low levels, enabling AND gate 240-2 and disabling AND gates 240-1 and 240-3 through 240-8.

The second rising edge in primary event stream PES (labeled FE2 in FIG. 3) propagates through buffer 210 and appears at the non-inverting output of buffer 210 as a rising edge in non-inverted primary event stream PES1. The rising edge in non-inverted primary event stream PES1 propagates through AND gate 240-2 where it appears as the first rising edge in secondary event stream SESR2. Note that the rising edge in non-inverted primary event stream PES1 appears at the output of AND gate 240-2 since the Q output of D flip-flop 226-2 is at a logic high level, but does not appear at the outputs of AND gates 240-1 and 240-3 through 240-8 since the Q outputs of D flip-flops 226-1 and 226-3 through 226-8 are at logic low levels.

The second falling edge in primary event stream PES (labeled FE2 in FIG. 3) propagates through buffer 210 and appears at the non-inverting output of buffer 210 as a falling edge in non-inverted primary event stream PES1. This falling edge clocks D-flip flops 226-1 through 226-8 causing the logic high value stored in D flip-flop 226-2 to shift into D flip-flop 226-3. As a result, the Q output of D flip-flop 226-3 is held at a logic high level and the Q outputs of D flip-flops 226-1 through 226-2 and 226-4 through 226-8 are held at logic low levels, enabling AND gate 240-3 and disabling AND gates 240-1 through 240-2 and 240-4 through 240-8.

The process described above continues so that the third rising edge in primary event stream PES appears as the first rising edge in secondary event stream SESR3, the fourth rising edge in primary event stream PES appears as the first rising edge in secondary event stream SESR4, the fifth rising edge in primary event stream PES appears as the first rising edge in secondary event stream SESR5, the sixth rising edge in primary event stream PES appears as the first rising edge in secondary event stream SESR6, the seventh rising edge in primary event stream PES appears as the first rising edge in secondary event stream SESR7, the eighth rising edge in primary event stream PES appears as the first rising edge in secondary event stream SESR8, the ninth rising edge in primary event stream PES appears as the second rising edge in secondary event stream SESR1, the tenth rising edge in primary event stream PES appears as the second rising edge in secondary event stream SESR2, the eleventh rising edge in primary event stream PES appears as the second rising edge in secondary event stream SESR3, and so on. Thus AND gates 240 function as a plurality of secondary event stream paths that are selectively enabled by output signals generated by Johnson counter 224.

For each rising edge in primary event stream PES, the propagation delay through buffer 210, the conductor/interconnect line between buffer 210 and its respective AND gate 240, and through its respective AND gate 240 may be slightly different. This is because the length of the conductor/interconnect lines may be different and since the delay through the buffer and each AND gate may be different. Using known calibration techniques, the differences between the propagation delays in each signal path can be measured. As a result, the relative timing between the rising edges in primary event stream PES can be maintained.

Figure 4:
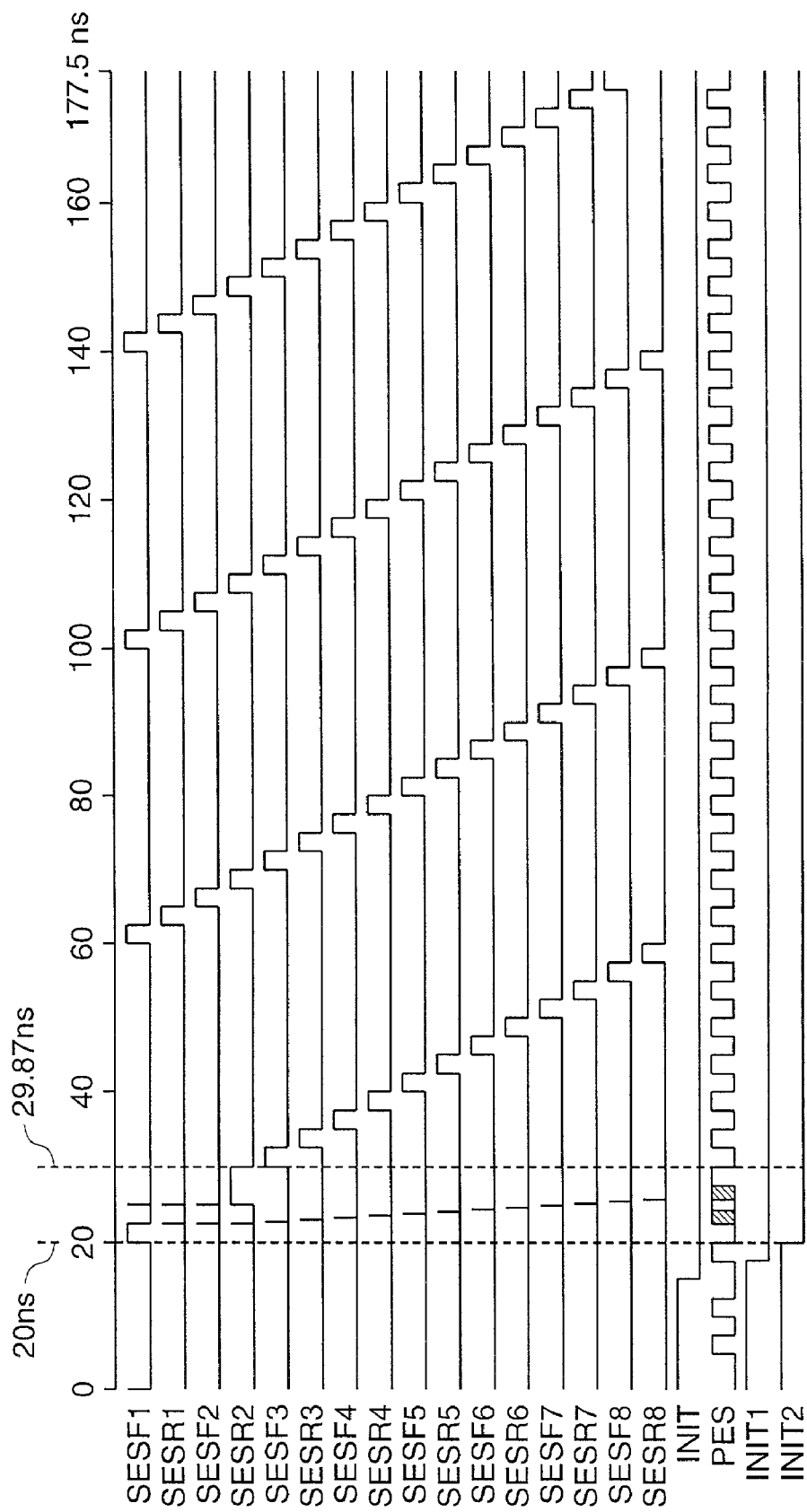
FIG. 4 is a timing diagram that includes waveforms for a primary event stream having a burst of events and corresponding secondary event streams.
Figure 5:
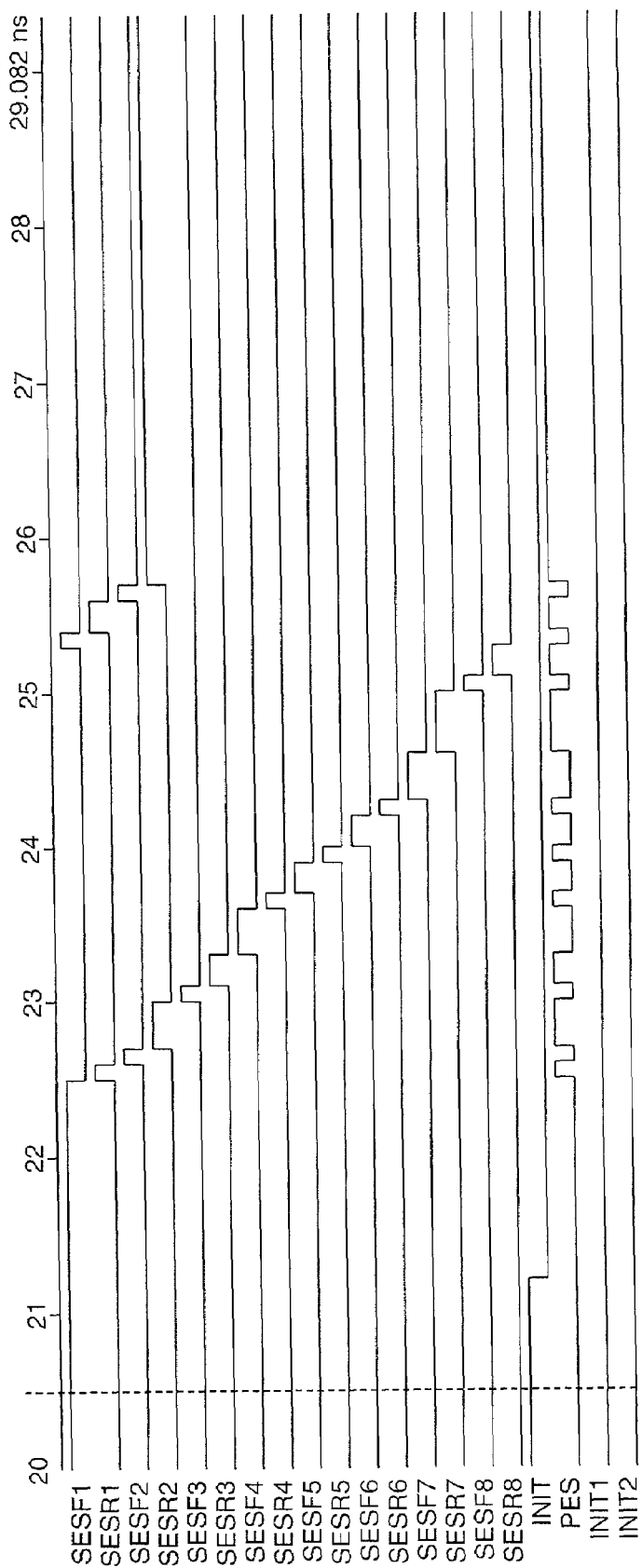
FIG. 5 is an expanded view of a portion of the timing diagram of FIG. 4.

One of the primary advantages of event stream distributor 200 is that it can be used to distribute a high event rate primary event stream across multiple secondary event streams. As such, the time at which each event occurs in the high event rate primary event stream can be recorded using multiple timestamp circuits. This is illustrated in FIG. 4. FIG. 4 is a timing diagram that shows a primary event stream PES that has a burst of high rate events that occur between 20 ns and 30 ns. FIG. 5 is a magnified portion of the timing diagram of FIG. 4 that shows how event stream distributor 200 distributes the burst of high rate events that occur between 20 ns and 30 ns across the multiple secondary event streams SESR1 through SESR8 and SESF1 through SESF8.

Although event stream distributor 200 distributes primary event stream PES across eight rising edge secondary event streams SESR and eight falling edge secondary event streams SESF, it should be recognized that event stream distributor 200 can easily be modified such that there can be any number of rising edge secondary event streams SESR and any number of falling edge secondary event streams SESF depending on the requirements of a particular application.

III. Event Stream Distributor Using 3-Bit Counters

A. Structure

Figure 6:
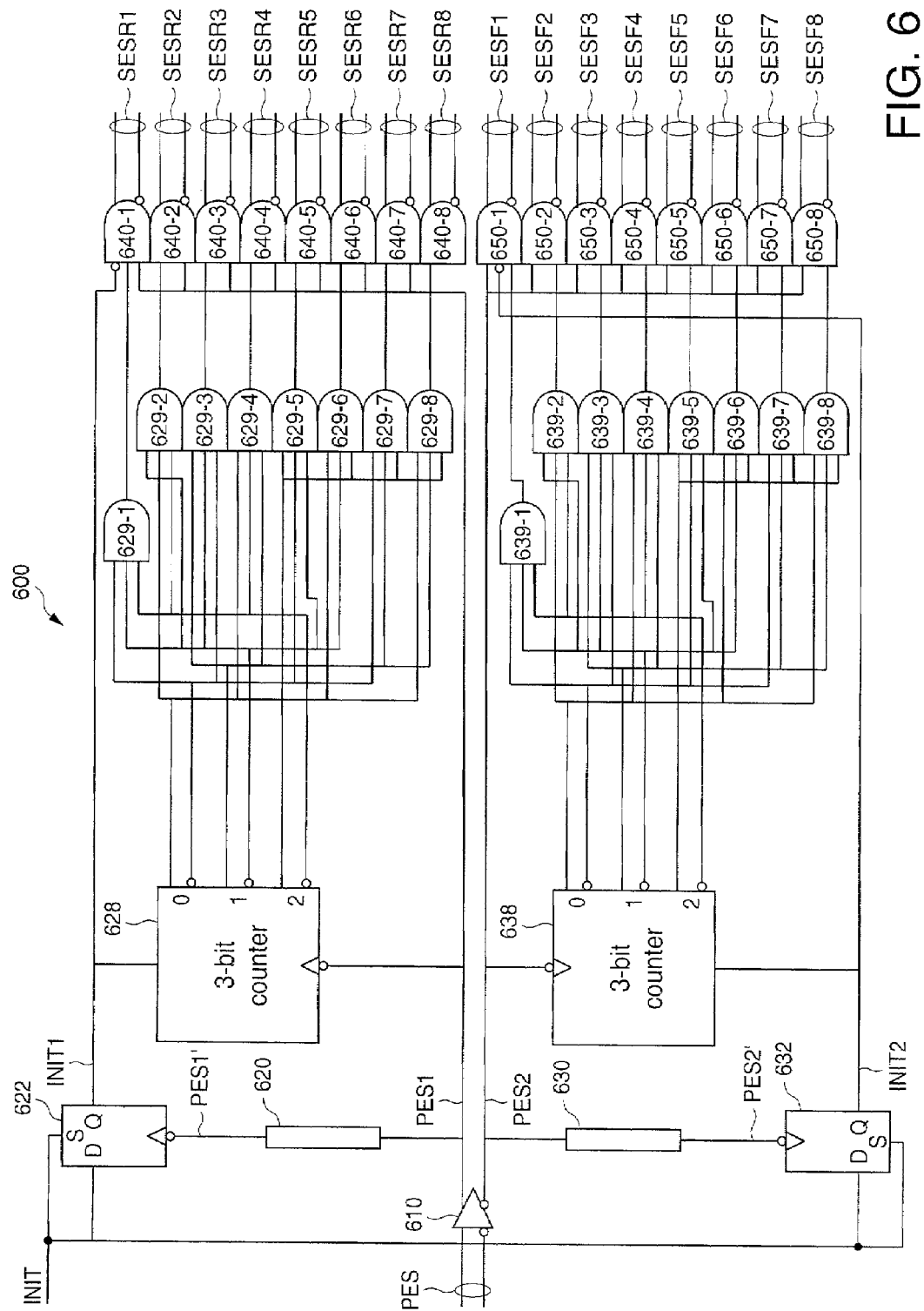
FIG. 6 is a schematic diagram of an event stream distributor that uses 3-bit counters, according to some embodiments of the present invention.

FIG. 6 is a schematic diagram of an event stream distributor 600, according to some embodiments of the present invention. Event stream distributor 600 is identical to event stream distributor 200 of FIG. 2 except that Johnson counter 224 has been replaced by 3-bit synchronous counter 628 and AND gates 629 (separately labeled 629-1 through 629-8), and Johnson counter 234 has been replaced by 3-bit synchronous counter 638 and AND gates 639 (separately labeled 639-1 through 639-8). The functions performed by 3-bit synchronous counter 628 and AND gates 629 taken together are identical to the functions performed by Johnson counter 224, and the functions performed by 3-bit synchronous counter 638 and AND gates 639 taken together are identical to the functions performed by Johnson counters 234.

Event stream distributor 600 has been found to be more economical than event stream distributor 200 if the maximum clock rate sustainable by 3-bit synchronous counters 328 and 338 is fast enough to keep up with the highest event rate in primary event stream PES. This is because 3-bit synchronous counter 328 and AND gates 329 together require less circuitry to implement than Johnson counter 224, and 3-bit synchronous counter 338 and AND gates 339 together require less circuitry to implement than Johnson counter 234.

Event stream distributor 600 includes an input portion, a rising edge distributor, and a falling edge distributor. The input portion includes a buffer 610. The rising edge distributor includes a delay element 620, a D flip-flop 622, a 3-bit synchronous counter 628, AND gates 629 (separately labeled 629-1 through 629-8), and AND gates 640 (separately labeled 640-1 through 640-8). The falling edge distributor includes a delay element 630, a D flip-flop 632, a 3-bit synchronous counter 638, AND gates 639 (separately labeled 639-1 through 639-8), and AND gates 650 (separately labeled 650-1 through 650-8).

Buffer 610 is coupled to receive a primary event stream PES. In the embodiment shown, primary event stream PES is a differential signal. In other embodiments, primary event stream PES is a single-ended signal. Buffer 610 receives primary event stream PES, buffers primary event stream PES, and outputs a non-inverted primary event stream PES1 at its non-inverting output and outputs an inverted primary event stream PES2 at its inverting output.

Delay element 620 is coupled to receive non-inverted primary event stream PES1 at its input. Delay element 620 delays non-inverted primary event stream PES1 and outputs delayed primary event stream PES1'.

D flip-flop 622 is coupled to receive delayed primary event stream PES1' at its inverting clock input. D flip-flop 622 is also coupled to receive an initialization signal INIT at its set S input and at its D input. D flip-flop 622 outputs an initialization signal INIT1 at its Q output. Initialization signal INIT1 is used to reset 3-bit synchronous counter 628.

3-bit synchronous counter 628 is coupled to receive non-inverted primary event stream PES1 at its inverting clock input. The reset R input of 3-bit synchronous counter 628 is coupled to receive initialization signal INIT1. 3-bit synchronous counter 628 has a first non-inverting output, a first inverting output, a second non-inverting output, a second inverting output, a third non-inverting output, and a third inverting output.

Each AND gate 629 includes three inputs. The inputs of each AND gate 629 are coupled to the first non-inverting output, the first inverting output, the second non-inverting output, the second inverting output, the third non-inverting output, and/or the third inverting output of 3-bit synchronous counter 628 in such a manner that the output of AND gate 629-1 is at a logic high level when the count of 3-bit synchronous counter 628 is 0, the output of AND gate 629-2 is at a logic high level when the count of 3-bit synchronous counter 628 is 1, the output of AND gate 629-3 is at a logic high level when the count of 3-bit synchronous counter 628 is 2, and so on until the output of AND gate 629-8 is at a logic high level when the count of 3-bit synchronous counter 628 is 7.

Each AND gate 640 is coupled to receive non-inverted primary event stream PES1 at a first non-inverting input. Each AND gate 640 is also coupled to respective outputs of respective AND gates 629 at a second non-inverting input. AND gate 640-1 is also coupled to receive initialization signal INIT1 at an inverting input. Each AND gate 640 outputs a respective rising edge secondary event stream SESR (separately labeled SESR1 through SESR8). In the embodiment shown, secondary event streams SESR are differential signals. In other embodiments, secondary event streams SESR can be single-ended signals.

Delay element 630 is coupled to receive inverted primary event stream PES2 at its input. Delay element 630 delays inverted primary event stream PES2 and outputs delayed primary event stream PES2'.

D flip-flop 632 is coupled to receive delayed primary event stream PES2' at its inverting clock input. D flip-flop 632 is also coupled to receive an initialization signal INIT at its set S input and at its D input. D flip-flop 632 outputs an initialization signal INIT2 at its Q output. Initialization signal INIT2 is used to reset 3-bit synchronous counter 638.

3-bit synchronous counter 638 is coupled to receive primary event stream PES2 at its inverting clock input. The reset R input of 3-bit synchronous counter 638 is coupled to receive initialization signal INIT2. 3-bit synchronous counter 638 has a first non-inverting output, a first inverting output, a second non-inverting output, a second inverting output, a third non-inverting output, and a third inverting output.

Each AND gate 639 includes three inputs. The inputs of each AND gate 639 are coupled to the first non-inverting output, the first inverting output, the second non-inverting output, the second inverting output, the third non-inverting output, and/or the third inverting output of 3-bit synchronous counter 638 in such a manner that the output of AND gate 639-1 is at a logic high level when the count of 3-bit synchronous counter 638 is 0, the output of AND gate 639-2 is at a logic high level when the count of 3-bit synchronous counter 638 is 1 the output of AND gate 639-3 is at a logic high level when the count of 3-bit synchronous counter 638 is 2, and so on until the output of AND gate 639-8 is at a logic high level when the count of 3-bit synchronous counter 638 is 7.

Each AND gate 650 is coupled to receive primary event stream PES2 at a first non-inverting input. Each AND gate 650 is also coupled to respective outputs of respective AND gates 639 at a second non-inverting input. AND gate 650-1 is also coupled to receive initialization signal INIT2 at an inverting input. Each AND gate 650 outputs a respective falling edge secondary event stream SESF (separately labeled SESF1 through SESF8). In the embodiment shown, secondary event streams SESF are differential signals. In other embodiments, secondary event streams SESF can be single-ended signals.

B. Operation

Event stream distributor 600 operates in an initialization mode and a normal mode. When operating in initialization mode, 3-bit synchronous counters 628 and 638 are initialized. When operating in normal mode, the rising edge distributor of event stream distributor 600 distributes rising edge events in primary event stream PES among secondary event streams SESR1 through SESR8, and the falling edge distributor of event stream distributor 600 distributes falling edge events in primary event stream PES among secondary event streams SESF1 through SESF8. Reference is made to the timing diagram of FIG. 3 when describing the operation of event stream distributor 600.

Event stream distributor 600 is placed in initialization mode by raising and holding initialization signal INIT at a logic high level. A falling edge in primary event stream PES propagates through buffer 610 and appears at the non-inverting output of buffer 610 as a falling edge in non-inverted primary event stream PES1. This falling edge travels through delay element 620 and clocks D flip-flop 622 thereby raising initialization signal INIT1 to a logic high level. This resets 3-bit synchronous counter 628. Thus, a logic high signal appears at the output of AND gate 629-1, which enables AND gate 640-1, while logic low signals appear at the outputs of AND gates 629-2 through 629-8, which disable AND gates 640-2 through 640-8.

Similarly, a rising edge in primary event stream PES propagates through buffer 610 and appears at the inverting output of buffer 610 as a falling edge in inverted primary event stream PES2. This falling edge travels through delay element 630 and clocks D flip-flop 632 thereby raising initialization signal INIT2 to a logic high level. This resets 3-bit synchronous counter 638. Thus, a logic high signal appears at the output of AND gate 639-1, which enables AND gate 650-1, while logic low signals appear at the outputs of AND gates 639-2 through 639-8, which disable AND gates 650-2 through 650-8.

Note that secondary event streams SESR1 through SESR8 and SESF1 through SESF8 are held at logic low levels when event stream distributor 600 is in initialization mode. Event stream distributor 600 is then taken out of initialization mode and placed in normal mode by lowering and holding initialization signal INIT at a logic low level.

When operating in normal mode, the falling edge distributor of event stream distributor 600 operates as follows. The first falling edge in primary event stream PES (labeled FE1 in FIG. 3) propagates through buffer 610 and appears at the inverting output of buffer 610 as a rising edge in inverted primary event stream PES2. The rising edge in inverted primary event stream PES2 propagates through AND gate 650-1 where it appears as the first rising edge in secondary event stream SESF1. Note that the rising edge in inverted primary event stream PES2 appears at the output of AND gate 650-1 since the output of AND gate 639-1 is at a logic high level, but does not appear at the outputs of AND gates 650-2 through 650-8 since the outputs of AND gates 639-2 through 639-8 are at logic low levels.

The first rising edge in primary event stream PES (labeled RE1 in FIG. 3) propagates through buffer 610 and appears at the inverting output of buffer 610 as a falling edge in inverted primary event stream PES2. This falling edge clocks 3-bit synchronous counter 638 causing the count to increment to a count of 1. As a result, the output of AND gate 639-2 is held at a logic high level and the outputs of AND gates 639-1 and 639-3 through 639-8 are held at logic low levels, enabling AND gate 650-2 and disabling AND gates 650-1 and 650-3 through 650-8.

The second falling edge in primary event stream PES (labeled FE2 in FIG. 3) propagates through buffer 610 and appears at the inverting output of buffer 610 as a rising edge in inverted primary event stream PES2. The rising edge in inverted primary event stream PES2 propagates through AND gate 650-2 where it appears as the first rising edge in secondary event stream SESF2. Note that the rising edge in inverted primary event stream PES2 appears at the output of AND gate 650-2 since the output of AND gate 639-2 is at a logic high level, but does not appear at the outputs of AND gates 650-1 and 650-3 through 650-8 since the outputs of AND gates 639-1 and 639-3 through 639-8 are at logic low levels.

The second rising edge in primary event stream PES (labeled RE2 in FIG. 3) propagates through buffer 610 and appears at the inverting output of buffer 610 as a falling edge in inverted primary event stream PES2. This falling edge clocks 3-bit synchronous counter 638 causing the count to increment to 2. As a result, the output of AND gate 639-3 is held at a logic high level and the outputs of AND gates 639-1 through 639-2 and 639-4 through 639-8 are held at logic low levels, enabling AND gate 650-3 and disabling AND gates 650-1 through 650-2 and 650-4 through 650-8.

The process described above continues so that the third falling edge in primary event stream PES appears as the first rising edge in secondary event stream SESF3, the fourth falling edge in primary event stream PES appears as the first rising edge in secondary event stream SESF4, the fifth falling edge in primary event stream PES appears as the first rising edge in secondary event stream SESF5, the sixth falling edge in primary event stream PES appears as the first rising edge in secondary event stream SESF6, the seventh falling edge in primary event stream PES appears as the first rising edge in secondary event stream SESF7, the eighth falling edge in primary event stream PES appears as the first rising edge in secondary event stream SESF8, the ninth falling edge in primary event stream PES appears as the second rising edge in secondary event stream SESF1, the tenth falling edge in primary event stream PES appears as the second rising edge in secondary event stream SESF2, the eleventh falling edge in primary event stream PES appears as the second rising edge in secondary event stream SESF3, and so on. Thus AND gates 650 function as a plurality of secondary event stream paths that are selectively enabled by output signals generated by 3-bit synchronous counter 638.

For each falling edge in primary event stream PES, the propagation delay through buffer 610, the conductor/interconnect line between buffer 610 and its respective AND gate 650, and through its respective AND gate 650 may be slightly different. This is because the length of the conductor/interconnect lines may be different and since the delay through the buffer and each AND gate may be different. Using known calibration techniques, the differences between the propagation delays in each signal path can be measured. As a result, the relative timing between the falling edges in primary event stream PES can be maintained.

When operating in normal mode, the rising edge distributor of event stream distributor 600 operates as follows. The first rising edge in primary event stream PES (labeled RE1 in FIG. 3) propagates through buffer 610 and appears at the non-inverting output of buffer 610 as a rising edge in non-inverted primary event stream PES1. The rising edge in non-inverted primary event stream PES1 propagates through AND gate 640-1 where it appears as the first rising edge in secondary event stream SESR1. Note that the rising edge in non-inverted primary event stream PES1 appears at the output of AND gate 640-1 since the output of AND gate 629-1 is at a logic high level, but does not appear at the outputs of AND gates 640-2 through 640-8 since the outputs of AND gates 629-2 through 629-8 are at logic low levels.

The first falling edge in primary event stream PES (labeled FE1 in FIG. 3) propagates through buffer 610 and appears at the non-inverting output of buffer 610 as a falling edge in non-inverted primary event stream PES1. This falling edge clocks 3-bit synchronous counter 628 causing the count to be incremented to 1. As a result, the output of AND gate 629-2 is held at a logic high level and the outputs of AND gates 629-1 and 629-3 through 629-8 are held at logic low levels, enabling AND gate 640-2 and disabling AND gates 640-1 and 640-3 through 640-8.

The second rising edge in primary event stream PES (labeled RE2 in FIG. 3) propagates through buffer 610 and appears at the non-inverting output of buffer 610 as a rising edge in non-inverted primary event stream PES1. The rising edge in non-inverted primary event stream PES1 propagates through AND gate 640-2 where it appears as the first rising edge in secondary event stream SESR2. Note that the rising edge in non-inverted primary event stream PES1 appears at the output of AND gate 640-2 since the output of AND gate 629-2 is at a logic high level, but does not appear at the outputs of AND gates 640-1 and 640-3 through 640-8 since the outputs of AND gates 629-1 and 629-3 through 629-8 are at logic low levels.

The second falling edge in primary event stream PES (labeled FE2 in FIG. 3) propagates through buffer 610 and appears at the non-inverting output of buffer 610 as a falling edge in non-inverted primary event stream PES1. This falling edge clocks 3-bit synchronous counter 628 causing the count to increment to 2. As a result, the output of AND gate 629-3 is held at a logic high level and the outputs of AND gates 629-1 through 629-2 and 629-4 through 629-8 are held at logic low levels, enabling AND gate 640-3 and disabling AND gates 640-1 through 640-2 and 640-4 through 640-8.

The process described above continues so that the third rising edge in primary event stream PES appears as the first rising edge in secondary event stream SESR3, the fourth rising edge in primary event stream PES appears as the first rising edge in secondary event stream SESR4, the fifth rising edge in primary event stream PES appears as the first rising edge in secondary event stream SESR5, the sixth rising edge in primary event stream PES appears as the first rising edge in secondary event stream SESR6, the seventh rising edge in primary event stream PES appears as the first rising edge in secondary event stream SESR7, the eighth rising edge in primary event stream PES appears as the first rising edge in secondary event stream SESR8, the ninth rising edge in primary event stream PES appears as the second rising edge in secondary event stream SESR1, the tenth rising edge in primary event stream PES appears as the second rising edge in secondary event stream SESR2, the eleventh rising edge in primary event stream PES appears as the second rising edge in secondary event stream SESR3, and so on. Thus AND gates 640 function as a plurality of secondary event stream paths that are selectively enabled by output signals generated by 3-bit synchronous counter 628.

For each rising edge in primary event stream PES, the propagation delay through buffer 610, the conductor/interconnect line between buffer 610 and its respective AND gate 640, and through its respective AND gate 640 may be slightly different. This is because the length of the conductor/interconnect lines may be different and since the delay through the buffer and each AND gate may be different. Using known calibration techniques, the differences between the propagation delays in each signal path can be measured. As a result, the relative timing between the rising edges in primary event stream PES can be maintained.

Although event stream distributor 600 distributes primary event stream PES across eight rising edge secondary event streams SESR and eight falling edge secondary event streams SESF, it should be recognized that event stream distributor 600 can easily be modified such that there can be any number of rising edge secondary event streams SESR and any number of falling edge secondary event streams SESF depending on the requirements of a particular application.

IV. Event Stream Distributor Having Registered Outputs

Figure 7:
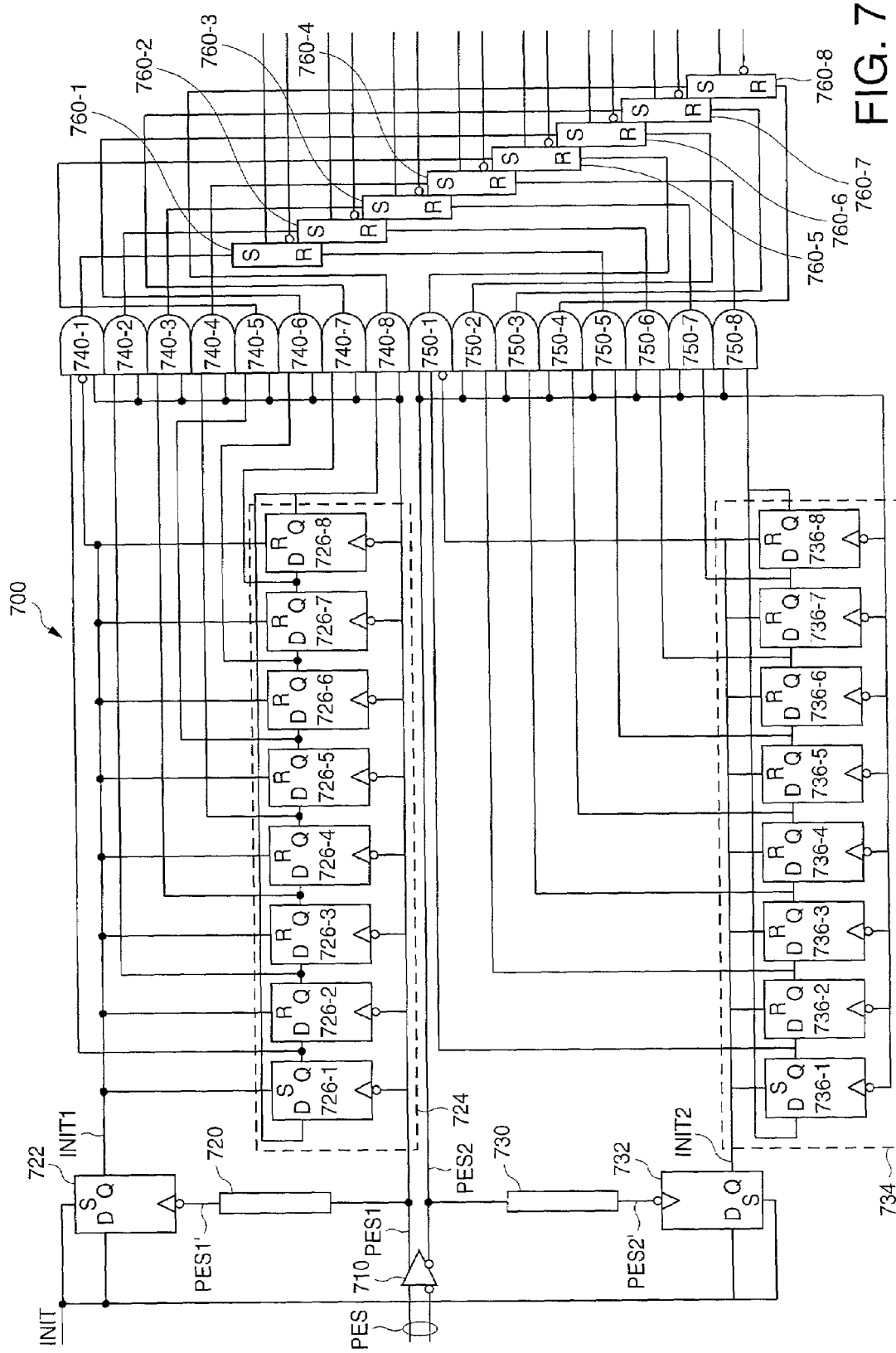
FIG. 7 is a schematic diagram of an event stream distributor that has registered secondary event stream outputs, according to some embodiments of the present invention.

FIG. 7 is a schematic diagram of an event stream distributor 700, according to some embodiments of the present invention. Event stream distributor 700 is identical to event stream distributor 200 of FIG. 2 except that event stream distributor 700 includes SR (set/reset) flip-flops 760 (separately labeled 760-1 through 760-8). The set S inputs of SR flip-flops 760 are coupled to the outputs of respective AND gates 740, while the reset R inputs of SR flip-flops 760 are coupled to the outputs of respective AND gates 750.

Event stream distributor 700 has been found to perform better than event stream distributors 200 and 600 if the event stream distributor is implemented on a first integrated circuit device and corresponding timestamp circuits are implemented on a second integrated circuit device. This is because event stream distributors 200 and 600 produce secondary event streams having relatively narrow pulse widths that may not be successfully transmitted from a first integrated circuit device to a second integrated circuit device due to packaging parasitics and board parasitics. SR flip-flops 760 of event stream distributor 700 minimize this problem by registering the outputs of AND gates 740 and 750. As a result, the secondary event streams SES have relatively wide pulse widths that can be successfully transmitted from a first integrated circuit device to a second integrated circuit device. An additional advantage of using SR flip-flops 760 to register the outputs of AND gates 740 and 750 is that the number of output signals is reduced by a factor of 2.

Figure 8:
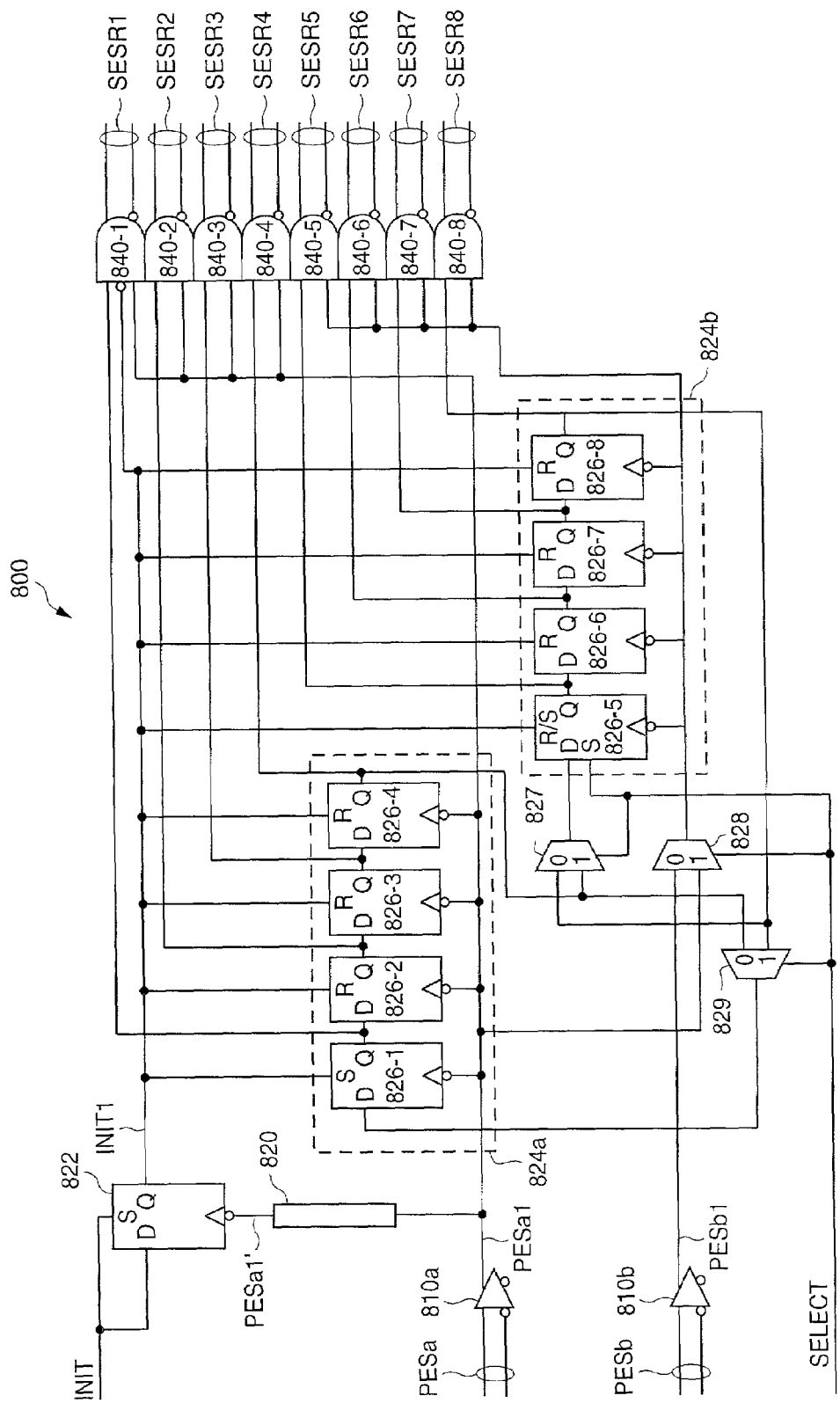
FIG. 8 is a schematic diagram of an event stream distributor that distributes two primary event streams, according to some embodiments of the present invention.

V. Event Stream Distributor Capable of Distributing Multiple Primary Event Streams A. Structure FIG. 8 is a schematic diagram of an event stream distributor 800, according to some embodiments of the present invention. Event stream distributor 800 is similar to event stream distributor 200 of FIG. 2, except that event stream distributor 800 is capable of receiving a single primary event stream (i.e., PESa) and distributing it across a single set of secondary event streams (e.g., SESR1 through SESR8), or event stream distributor 800 is capable of receiving a first primary event stream (i.e., PESa) and distributing the first primary event stream across a first set of secondary event streams (i.e., SESR1 through SESR4) and is capable of receiving a second primary event stream (i.e., PESb) and distributing the second primary event stream across a second set of secondary event streams (i.e., SESR5 through SESR8). It should be recognized that event stream distributor 800 can be modified such any number of primary event streams can be distributed across any number of sets of secondary event streams.

Event stream distributor 800 includes an input portion and a rising edge distributor. For clarity, a corresponding falling edge distributor, which is similar to the rising edge distributor, is not shown. The input portion includes buffers 810a and 810b. The rising edge distributor includes a delay element 820, a D flip-flop 822, a Johnson counter having a first section 824a and a second section 824b, multiplexers 827, 828, and 829, and AND gates 840 (separately labeled 840-1 through 840-8). The first section 824a of the Johnson counter includes D flip-flops 826-1 through 826-4, and the second section 824b of the Johnson counter includes D flip-flops 826-5 through 826-8.

Buffer 810a is coupled to receive a first primary event stream PESa, and buffer 810b is coupled to receive a second primary event stream PESb. In the embodiment shown, first and second primary event streams PESa and PESb are differential signals. In other embodiments, first primary event stream PESa and/or second primary event stream PESb can be single-ended signals. Buffer 810a buffers primary event stream PESa and outputs non-inverted primary event stream PESa1 at its non-inverting output. Buffer 810b buffers primary event stream PESb and outputs non-inverted primary event stream PESb1 at its non-inverting output.

Delay element 820 is coupled to receive non-inverted primary event stream PESa1 at its input. Delay element 820 delays non-inverted primary event stream PESa1 and outputs delayed primary event stream PESa1'.

D flip-flop 822 is coupled to receive delayed primary event stream PESa1' at its inverting clock input. D flip-flop 822 is also coupled to receive an initialization signal INIT at its set S input and at its D input. D flip-flop 822 outputs an initialization signal INIT1 at its Q output. Initialization signal INIT1 is used to set D flip-flop 826-1, reset D flip-flops 826-2 through 826-4, set or reset D flip-flop 826-5 (depending on the value of the select signal SELECT), and reset D flip-flops 826-6 through 826-8.

D flip-flops 826-1 through 826-4 of the first section 824a of the Johnson counter are coupled to receive non-inverted primary event stream PESa1 at their inverting clock inputs. As such, D flip-flops 826-1 through 826-4 are simultaneously clocked by the falling edges in primary event stream PESa1.

Multiplexer 828 is coupled to receive non-inverted primary event stream PESa1 and non-inverted primary event stream PESb1. Multiplexer 828 is also coupled to receive the select signal SELECT. D flip-flops 826-5 through 826-8 of the first section 824b of the Johnson counter are coupled to receive the output of multiplexer 828 at their inverting clock inputs. Depending on the value of the select signal SELECT, the output of multiplexer 828 is either non-inverted first primary event stream PESa1 or non-inverted second primary event stream PESb1. As such, D flip-flops 826-5 through 826-8 are simultaneously clocked by either the falling edges non-inverted first primary event stream PESa1 or non-inverted second primary event stream PESb1.

Depending on the value of the select signal SELECT, D flip-flops 826 of the first section 824a of the Johnson counter and D flip-flops 826 of the second section 824b of the Johnson counter are configured as a single ring or as two separate rings. If the select signal SELECT is at a logic high level, multiplexers 827 and 829 will configure the D flip-flops 826 of the first section 824a of the Johnson counter and the D flip-flops 826 of the second section 824b of the Johnson counter as a single ring. In this configuration, the Q output of D flip-flop 826-1 is coupled to the D input of D flip-flop 826-2, the Q output of D flip-flop 826-2 is coupled to the D input of D flip-flop 826-3, the Q output of D flip-flop 826-3 is coupled to the D input of D flip-flop 826-4, the Q output of D flip-flop 826-4 is coupled to the D input of D flip-flop 826-5 (via multiplexer 827), the Q output of D flip-flop 826-5 is coupled to the D input of D flip-flop 826-6, the Q output of D flip-flop 826-6 is coupled to the D input of D flip-flop 826-7, the Q output of D flip-flop 826-7 is coupled to the D input of D flip-flop 826-8, and the Q output of D flip-flop 826-8 is coupled to the D input of D flip-flop 826-1 (via multiplexer 829) thereby forming a single ring.

If the select signal SELECT is at a logic low level, multiplexers 827 and 829 will configure the D flip-flops 826 of the first section 824a of the Johnson counter and the D flip-flops 826 of the second section 824b of the Johnson counter as two separate rings. In this configuration, the Q output of D flip-flop 826-1 is coupled to the D input of D flip-flop 826-2, the Q output of D flip-flop 826-2 is coupled to the D input of D flip-flop 826-3, the Q output of D flip-flop 826-3 is coupled to the D input of D flip-flop 826-4, and the Q output of D flip-flop 826-4 is coupled to the D input of D flip-flop 826-1 to form a first ring. Additionally, the Q output of D flip-flop 826-5 is coupled to the D input of D flip-flop 826-6, the Q output of D flip-flop 826-6 is coupled to the D input of D flip-flop 826-7, the Q output of D flip-flop 826-7 is coupled to the D input of D flip-flop 826-8, and the Q output of D flip-flop 826-8 is coupled to the D input of D flip-flop 826-5 to form a second ring.

AND gates 840-1 through 840-4 are coupled to receive non-inverted primary event stream PESa1 at a first non-inverting input. AND gates 840-1 through 840-4 are also coupled to respective Q outputs of D flip-flops 826-1 through 826-4 at a second non-inverting input. AND gate 840-1 includes an inverting input that is coupled to receive initialization signal INIT1.

AND gates 840-5 through 840-8 are coupled to receive the output of multiplexer 828 at a first non-inverting input. AND gates 840-5 through 840-8 are also coupled to respective Q outputs of D flip-flops 826-5 through 826-8 at a second non-inverting input.

Each AND gate 840 outputs a respective rising edge secondary event stream SESR (separately labeled SESR1 through SESR8). In the embodiment shown, secondary event streams SESR are differential signals. In other embodiments, secondary event streams SESR can be single-ended signals.

B. Operation

Event stream distributor 800 operates in an initialization mode, a single primary event stream mode, and a dual primary event stream mode. When operating in initialization mode, first section 824a and second section 824b of the Johnson counter are initialized. When operating in single primary event stream mode, event stream distributor 800 distributes rising edge events in first primary event stream PESa among secondary event streams SESR1 through SESR8. When operating in dual primary event stream mode, event stream distributor 800 distributes rising edge events in first primary event stream PESa among secondary event streams SESR1 through SESR4 and distributes rising edge events in second primary event stream PESb among secondary event streams SESR5 through SESR8.

Event stream distributor 800 is placed in initialization mode by raising and holding initialization signal INIT at a logic high level. A falling edge in primary event stream PESa travels through buffer 810a and appears at the non-inverting output of buffer 810a as a falling edge in inverted primary event stream PESa1. This falling edge travels through delay element 820 and clocks D flip-flop 822 thereby raising initialization signal INIT1 to a logic high level.

At this time, the select signal SELECT will be at a logic high level if event stream distributor 800 will subsequently operate in single primary event stream mode. In this case, the initialization signal INITL will set D flip-flop 826-1 and reset D flip-flops 826-2 through 826-8. On the other hand, the select signal SELECT will be at a logic low level if event stream distributor 800 will subsequently operate in dual primary event stream mode. In this case, the initialization signal INIT1 will set D flip-flops 826-1 and 826-5 and reset D flip-flops 826-2 through 826-4 and 826-6 through 826-8.

Note that secondary event streams SESR1 through SESR8 are held at logic low levels when event stream distributor 800 is in initialization mode. Event stream distributor 800 is then taken out of initialization mode and placed in normal mode by lowering and holding initialization signal INIT at a logic low level. The select signal SELECT, however, remains at the same logic level it was at during initialization mode (i.e., either a logic high level or a logic low level).

When operating in single primary event stream mode, the rising edge distributor of event stream distributor 800 operates in a manner similar to that described above with reference to event stream distributor 200. First primary event stream PESa is distributed across secondary event streams SESR1 through SESR8 and second primary event stream PESb is not used. Thus in operation, the first rising edge in first primary event stream PESa appears as the first rising edge in secondary event stream SESR1, the second rising edge in first primary event stream PESa appears as the second rising edge in secondary event stream SESR2, and so on until the seventh rising edge in first primary event stream PESa appears as the first rising edge in secondary event stream SESR7, the eighth rising edge in first primary event stream PESa appears as the first rising edge in secondary event stream SESR8, the ninth rising edge in first primary event stream PESa appears as the second rising edge in secondary event stream SESR1, the tenth rising edge in first primary event stream PESa appears as the second rising edge in secondary event stream SESR2, the eleventh rising edge in first primary event stream PESa appears as the second rising edge in secondary event stream SESR3, and so on.

When operating in dual primary event stream mode, the first section 824a of the Johnson counter in conjunction with AND gates 840-1 through 840-4 distribute the events of first primary event stream PESa across secondary event streams SESR1 through SESR4, and the second section 824b of the Johnson counter in conjunction with AND gates 840-5 through 840-8 distribute the events of second primary event stream PESb across secondary event streams SESR5 through SESR8. Thus in operation, the first rising edge in first primary event stream PESa appears as the first rising edge in secondary event stream SESR1, the second rising edge in first primary event stream PESa appears as the second rising edge in secondary event stream SESR2, the third rising edge in first primary event stream PESa appears as the first rising edge in secondary event stream SESR3, the fourth rising edge in first primary event stream PESa appears as the first rising edge in secondary event stream SESR4, the fifth rising edge in first primary event stream PESa appears as the second rising edge in secondary event stream SESR1, the sixth rising edge in first primary event stream PESa appears as the second rising edge in secondary event stream SESR2, and so on.

Similarly, the first rising edge in second primary event stream PESb appears as the first rising edge in secondary event stream SESR5, the second rising edge in second primary event stream PESb appears as the second rising edge in secondary event stream SESR6, the third rising edge in second primary event stream PESb appears as the first rising edge in secondary event stream SESR7, the fourth rising edge in second primary event stream PESb appears as the first rising edge in secondary event stream SESR8, the fifth rising edge in second primary event stream PESb appears as the second rising edge in secondary event stream SESR5, the sixth rising edge in second primary event stream PESb appears as the second rising edge in secondary event stream SESR6, and so on.

V. Alternative Embodiments

Numerous alternative embodiments of the present invention have been discussed above. However, those of ordinary skill in the art will recognize that modifications can be made to the embodiments discussed above and that all such embodiments are within the scope of the present invention. For example, although the counters and the AND gates that output the secondary event streams are driven by single-ended signals in the embodiments shown, it should be recognized that the counters and the AND gates that output the secondary event streams can also be driven by differential signals.

I claim:

1. A method for timestamping events in a primary event stream, the method comprising:

receiving the primary event stream;

apportioning events in the primary event stream among a plurality of secondary event streams; and timestamping events in each of the plurality of secondary event streams such that each timestamp represents a known value at the occurrence of a given event, wherein each timestamp has a first component comprising a specific clock cycle of a reference clock and a second component comprising a time at which the given event occurs within the specific clock cycle.

2. The method of claim 1 wherein an event rate in each of the secondary event streams is lower than an event rate in the primary event stream.

3. The method of claim 1 wherein an event rate in each of the secondary event streams is lower than an event rate in the primary event stream.

4. The method of claim 1 wherein the primary event stream is a differential signal.

5. The method of claim 1 wherein the secondary event streams are differential signals.

6. The method of claim 1 wherein apportioning events in the primary event stream comprises selectively enabling a plurality of gates such that a first event in the primary event stream passes through a first gate for generating a first one of the plurality of the secondary event streams, a second event in the primary event stream passes through a second gate for generating a second one of the plurality of the secondary event streams, and so on until an Nth event in the primary event stream passes through an Nth gate for generating an Nth one of the plurality of the secondary event streams, wherein N is a positive integer.

7. The method of claim 1 wherein apportioning events in the primary event stream comprises selectively enabling a plurality of gates using a counter that is clocked by the primary event stream such that a first event in the primary event stream passes through a first gate for generating a first one of the plurality of the secondary event streams, a secondary event in the primary event stream passes through a second gate for generating a second one of the plurality of the secondary event streams, and so on until an Nth event in the primary event stream passes through an Nth gate for generating an Nth one of the plurality of the secondary event streams, wherein N is a positive integer.

8. The method of claim 1 wherein apportioning events in the primary event stream comprises:
apportioning rising edge events in the primary event stream among a first set of the plurality of secondary event streams; and
apportioning falling edge events in the primary event stream among a second set of the plurality of secondary event streams.

9. The method of claim 1 further comprising:
registering the events in each of the secondary event streams.

10. A timestamp system comprising:
an event stream distributor, coupled to receive the primary event stream, for apportioning events in the primary event stream across a plurality of secondary event streams; and
a plurality of timestamp circuits, each timestamp circuit coupled to receive a respective secondary event stream from the event stream distributor, wherein each of the plurality of timestamp circuits record the times at which events occur in the respective received secondary event stream such that each recorded time represents a known value at the occurrence of a given event, wherein each of the recorded times have a first component comprising a specific clock cycle of a reference clock and a second component comprising a time at which the given event occurs within the specific clock cycle.

11. The timestamp system of claim 10 wherein an event rate in each of the secondary event streams is lower than an event rate in the primary event stream.

12. The timestamp system of claim 10 wherein the relative timing of the events in the primary event stream is maintained in each of the secondary event streams.

13. The timestamp system of claim 10 wherein the primary event stream is a differential signal.

14. The timestamp system of claim 10 wherein the secondary event streams are differential signals.

15. The timestamp system of claim 10 wherein the event stream distributor further comprises:
a first counter coupled to receive the primary event stream; and
a first plurality of gates coupled to the first counter.

16. The timestamp system of claim 15 wherein the first counter is a Johnson counter.

17. The timestamp system of claim 15 wherein the first counter is an N-bit counter.

18. The timestamp system of claim 15 further comprising:
a second counter coupled to receive the primary event stream; and
a second plurality of gates coupled to the second counter.

19. The timestamp system of claim 10 further comprising:
a plurality of registers, each register operable to register events of one or more secondary event streams.

20. The timestamp system of claim 10, wherein the number of secondary event streams is a function of a maximum event rate in the primary event stream and a minimum period of elapse time between consecutive events for the timestamp circuit to accurately record all of the events in the primary event stream.

21. A circuit for apportioning events in a signal, the circuit comprising:
a first counter coupled to receive a signal having a plurality of events; and
a first plurality of gates, each gate of the first plurality of gates coupled to receive the signal and each gate of the first plurality of gates coupled to receive a respective control signal from the first counter, wherein the events of the signal are apportioned among the outputs of the first plurality of gates as a function of the respective control signal from the first counter.

22. The circuit of claim 21 wherein the first plurality of gates are AND gates.

23. The circuit of claim 21 wherein the signal is a differential signal.

24. The circuit of claim 21 wherein the signal is a single-ended signal.

25. The circuit of claim 21 wherein the first counter is a Johnson counter.

26. The circuit of claim 21 wherein the first counter is an N-bit counter.

27. The circuit of claim 21 further comprising:
a second counter coupled to receive the signal; and
a second plurality of gates, each gate of the second plurality of gates coupled to receive the signal and each gate of the second plurality of gates coupled to receive a respective control signal from the second counter, wherein the events of the signal are apportioned among the outputs of the second plurality of gates as a function of the respective control signal from the second counter.

* * * * *